United States Patent

[11] 3,600,609

[72] Inventor Alton O. Christensen
Houston, Tex.
[21] Appl. No. 8,208
[22] Filed Feb. 3, 1970
[45] Patented Aug. 17, 1971
[73] Assignee Shell Oil Company
New York, N.Y.

[54] IGFET READ AMPLIFIER FOR DOUBLE-RAIL MEMORY SYSTEMS
6 Claims, 2 Drawing Figs.

[52] U.S. Cl. .......... 307/279, 307/241, 307/251, 307/264, 330/30 D, 330/35, 340/173
[51] Int. Cl. .......... H03k 3/26, G11c 11/40
[50] Field of Search .......... 307/205, 251, 279, 304, 246, 241, 264; 330/30 D, 35, 38 R; 340/173

[56] References Cited
UNITED STATES PATENTS

| | | | |
|---|---|---|---|
| 3,493,786 | 2/1970 | Ahrons et al. | 307/279 |
| 3,514,765 | 5/1970 | Christensen | 307/251 X |
| 3,521,081 | 7/1970 | Vasseur et al. | 307/205 |
| 3,530,443 | 9/1970 | Crafts et al. | 307/279 X |
| 3,535,699 | 10/1970 | Gaensslen et al. | 307/279 X |

*Primary Examiner*—Stanley T. Krawczewicz
*Attorneys*—J. H. McCarthy and Theodore E. Bieber

ABSTRACT: A pair of cross-coupled IGFET devices connected in a race mode are combined with IGFET inverters to convert a differential double-rail output of an IGFET memory circuit into a full-logic-level double-rail data output.

PATENTED AUG 17 1971

3,600,609

INVENTOR
ALTON O. CHRISTENSEN
BY
Mellin, Moore + Weissenberger
ATTORNEYS

IGFET READ AMPLIFIER FOR DOUBLE-RAIL MEMORY SYSTEMS

BACKGROUND OF THE INVENTION

Copending application Ser. No. 821,755filed May 5, 1969,entitled "Memory System for Integrated Circuits," now Pat. No. 3,528,065,describes an IGFET (insulated gate field effect transistor) memory system in which the output of the addressed memory cell is a differential double-rail output in which logic "1" is represented by a full logic "1" voltage level and logic "0" is represented by a slightly lesser voltage level. In order to utilize this type of output for data processing, it is necessary to convert the differential output of the circuit of the aforesaid copending application into an output in which logic "1" is represented by a full logic "1" voltage level and logic "0" is represented by full ground.

Read amplifiers capable of performing this function are well known in the art, but the prior art embodiments of such amplifiers have not been adaptable to IGFET circuitry and have been unduly complex.

SUMMARY OF THE INVENTION

The present invention provides a read amplifier for converting a differential double-rail output signal into a full-logic level data signal by the simple expedient of using the differential signal to control the race mode of a pair of cross-coupled IGFET elements, and then inverting the nodal signals through ratioless IGFET inverters to produce full-logic-level outputs.

It is therefore the object of the invention to provide a simple IGFET read amplifier for converting a differential double-rail output into a full-logic double-rail output

DESCRIPTION OF THE PREFERRED EMBODIMENT

Figure 1:
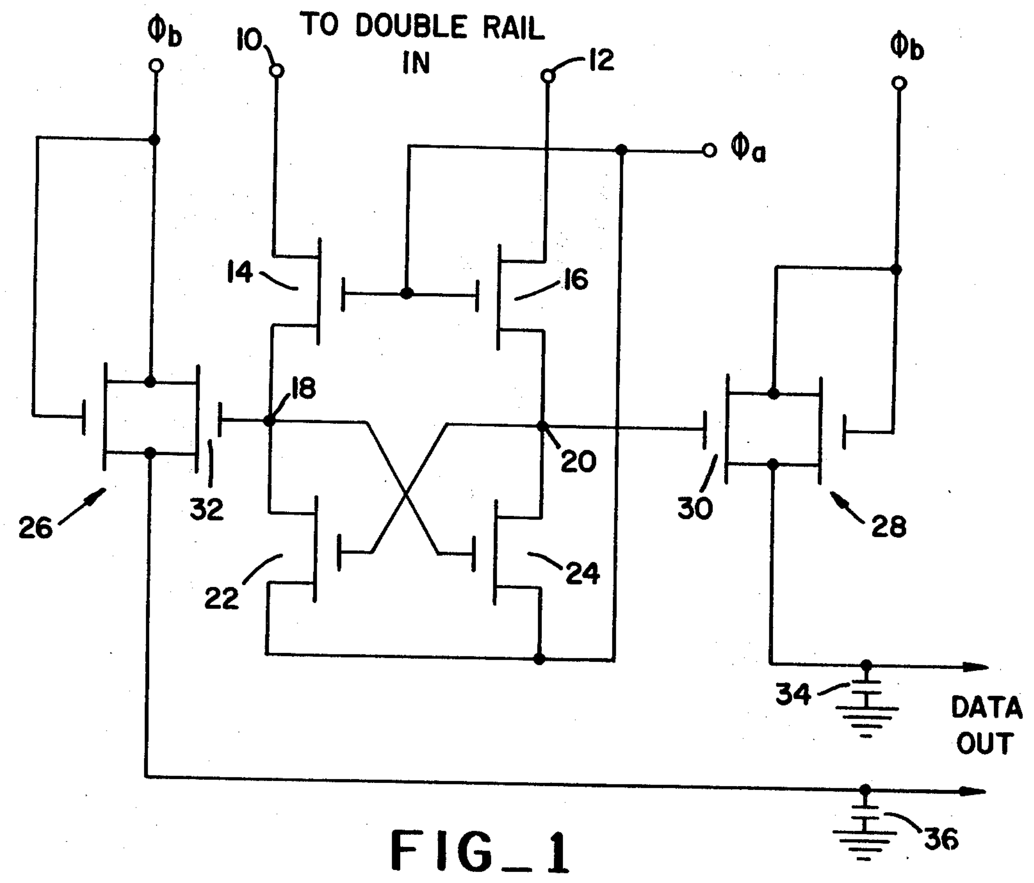
FIG. 1 is a circuit diagram of the read amplifier of this invention.
Figure 2:
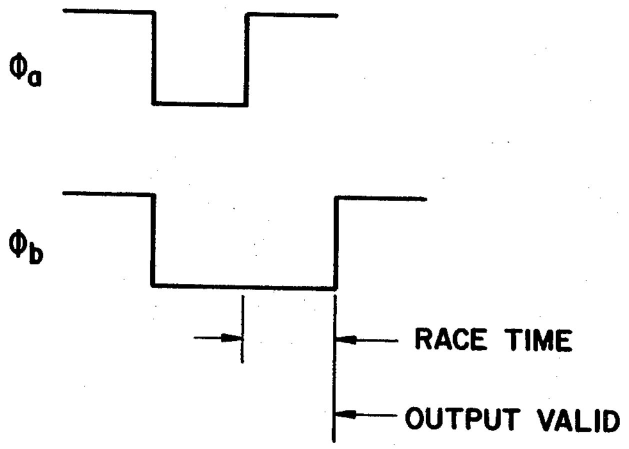
FIG. 2 is a time-amplitude diagram illustrating the relationship of the clock pulses used in the circuit of FIG. 1.

The differential output of the memory circuit of the aforesaid copending application is applied to input terminals 10, 12 of the circuit of this invention during a time interval controlled by the gating pulse $\Phi_a$, which corresponds to clock $\Phi_3$in the aforesaid copending application. During the clock pulse $\Phi_a$, the signal gates 14, 16 are enabled and nodes 18, 20, respectively, are brought to slightly different potentials. Inasmuch as the potential at both of the input terminals 10, 12 is above threshold, the gates of cross-connected IGFETs 22, 24 are both enabled. Consequently, if input 12 is at full logic "1", nodes 20 will be brought to full logic "1" potential both through IGFET 16 and through IGFET 24. On the other hand, if the potential at input 10 is somewhat less than logic "1," node 18 will be brought to a potential between that of input 10 and the logic "1" potential of clock $100_a$due to the ratioing effect of IGFETs 14 and 22.

Upon the cessation of the clock pulse $\Phi_a$, a race begins between the cross-coupled IGFETs 22 and 24. The node with the lesser potential, in this case node 18, will be the first to reach threshold, thereby cutting off the connection between node 20 and the now grounded $\Phi_a$through IGFET 24. Consequently, node 20 will stay above threshold while node 18 discharges fully through IGFET 22 into the now grounded $\Phi_a$.

During $\Phi_a$and also during the race period, the inverters 26, 28 are being precharged from the clock source $\Phi_b$. When the clock $\Phi_b$returns to ground, data gate 30 will still be enabled whereas data gate 32 is now blocked. Consequently, upon the cessation of $\Phi_b$, the data output line capacitance 34 will discharge to ground through data gate 30, whereas the data output line capacitance 36 will remain at the full logic "1" level imparted to it by $\Phi_b$.

It will be seen that the output of the double-rail data output line is a full-logic-level but inverted version of the differential data signal appearing at inputs 10, 12. The output data is suitable for processing in this manner, but if it is desired to restore the original sign of the data output, the data output may readily be processed through an additional pair of inverters (not shown).

Although a double-rail output is shown herein, it will be understood that a single-rail output can be produced by simply omitting one of the inverters.

Also, the relative position and length of the clock pulses can be varied, provided the node condition is established in accordance with the input signal prior to the beginning of the race, and the inverters are not read until the race has been completed.

I claim:

1. An IGFET read amplifier for converting a double-rail differential memory output signal to a full-logic output signal, comprising:

a. a source of first clock pulses;

b. a pair of cross-coupled IGFET means each having a source-drain circuit connected between a node and said source of first clock pulses, and a gate electrode connected to the node of the opposite IGFET means;

c. means for applying a double-rail differential signal to said nodes; and d. level-converting means having data input means connected to one of said nodes;

e. the output of said level-converting means being at full logic level and constituting the full-logic output signal of said amplifier.

2. The amplifier of claim 1, in which said level-converting means is a ratioless IGFET inverter, and said data input means is the data gate electrode of said IGFET inverter.

3. The amplifier of claim 2, in which said inverter is powered by second clock pulses.

4. The amplifier of claim 3, in which said second clock pulses have the same onset but a longer duration than said first clock pulses.

5. The amplifier of claim 1, in which said signal-applying means include double-rail signal gate means connected between a source of double-rail differential signals and said nodes; and means for enabling said signal gate means simultaneously with the presence of said first clock pulses.

6. The amplifier of claim 1, in which said level-converting means include a pair of ratioless IGFET inverters, one connected to each of said nodes, to produce a full-logic-level double-rail output at the outputs of said inverters.